(12) United States Patent
Petrachek et al.

(10) Patent No.: US 10,171,892 B2
(45) Date of Patent: Jan. 1, 2019

(54) SYSTEM AND METHOD FOR MONITORING WATER LEVEL ON A ROOF

(71) Applicants: John Petrachek, Etobicoke (CA); Xuewen Zhu, Markham (CA); Jiang Li, Thornhill (CA); Jianbin Xiao, Richmond Hill (CA)

(72) Inventors: John Petrachek, Etobicoke (CA); Xuewen Zhu, Markham (CA); Jiang Li, Thornhill (CA); Jianbin Xiao, Richmond Hill (CA)

( * ) Notice: Subject to any disclaimer, the term of this patent is extended or adjusted under 35 U.S.C. 154(b) by 0 days.

(21) Appl. No.: 15/347,409

(22) Filed: Nov. 9, 2016

(65) Prior Publication Data

US 2018/0054662 A1    Feb. 22, 2018

Related U.S. Application Data

(60) Provisional application No. 62/375,687, filed on Aug. 16, 2016.

(51) Int. Cl.
| | |
|---|---|
| *H04Q 9/00* | (2006.01) |
| *G01F 23/30* | (2006.01) |
| *H04L 29/08* | (2006.01) |
| *E04D 5/14* | (2006.01) |
| *E04D 13/00* | (2006.01) |
| *G01K 1/02* | (2006.01) |
| *G01K 1/14* | (2006.01) |
| *G08B 21/18* | (2006.01) |
| *G08B 17/06* | (2006.01) |

(52) U.S. Cl.
CPC ............... *H04Q 9/00* (2013.01); *E04D 13/00* (2013.01); *G01F 23/30* (2013.01); *G01K 1/024* (2013.01); *G01K 1/14* (2013.01); *G08B 17/06* (2013.01); *G08B 21/182* (2013.01); *H04L 67/20* (2013.01); *H04L 67/26* (2013.01); *E04D 5/148* (2013.01); *H04Q 2209/00* (2013.01); *H04Q 2209/10* (2013.01); *H04Q 2209/40* (2013.01); *H04Q 2209/70* (2013.01)

(58) Field of Classification Search
CPC ..... B03D 1/028; G01F 23/00; G01F 23/0038; G01F 23/30; G01F 23/303; G08B 21/182; G08B 17/06; H04Q 9/00; H04Q 2209/00; H04Q 2209/10; H04Q 2209/40; H04Q 2209/70; H04Q 2209/75; H04Q 2209/823; H04Q 2209/826; H04L 67/20; H04L 67/26; E04D 13/00; E04D 5/148; G01K 1/024; G01K 1/14
See application file for complete search history.

(56) References Cited

U.S. PATENT DOCUMENTS 4,800,372 A * 1/1989 Poteet .................. G08B 21/182
116/110
4,894,924 A * 1/1990 Nakanishi ................ G01C 5/04
33/367

(Continued)

*Primary Examiner* — Hai Phan
*Assistant Examiner* — Franklin Balseca
(74) *Attorney, Agent, or Firm* — Bereskin & Parr LLP

(57) ABSTRACT

A drain monitor, a system, and a method monitor water level on a roof. The drain monitor includes a base for attaching to the roof, a riser attached to the base and projecting from the roof, a water level sensor attached to the riser for measuring water level on the roof, and a communication system positioned on the riser for transmitting measurement data received from the water level sensor.

14 Claims, 10 Drawing Sheets

(56) References Cited

U.S. PATENT DOCUMENTS

| | | | | |
|---|---|---|---|---|
| 6,786,091 B1* | 9/2004 | Aleali | ................ | G01F 23/30 |
| | | | | 73/305 |
| 9,576,463 B2* | 2/2017 | Walbert | ................ | G08B 21/10 |
| 9,683,400 B2* | 6/2017 | Momcilovich | ......... | E05F 15/71 |
| 2009/0201123 A1* | 8/2009 | Kafry | ................ | E03F 5/042 |
| | | | | 340/3.32 |
| 2011/0307106 A1* | 12/2011 | Dutt | ................ | E03F 7/00 |
| | | | | 700/282 |
| 2012/0260729 A1* | 10/2012 | Bayley | ................ | G01F 23/363 |
| | | | | 73/305 |
| 2015/0269830 A1* | 9/2015 | Beldon | ................ | G08B 5/36 |
| | | | | 340/666 |

* cited by examiner

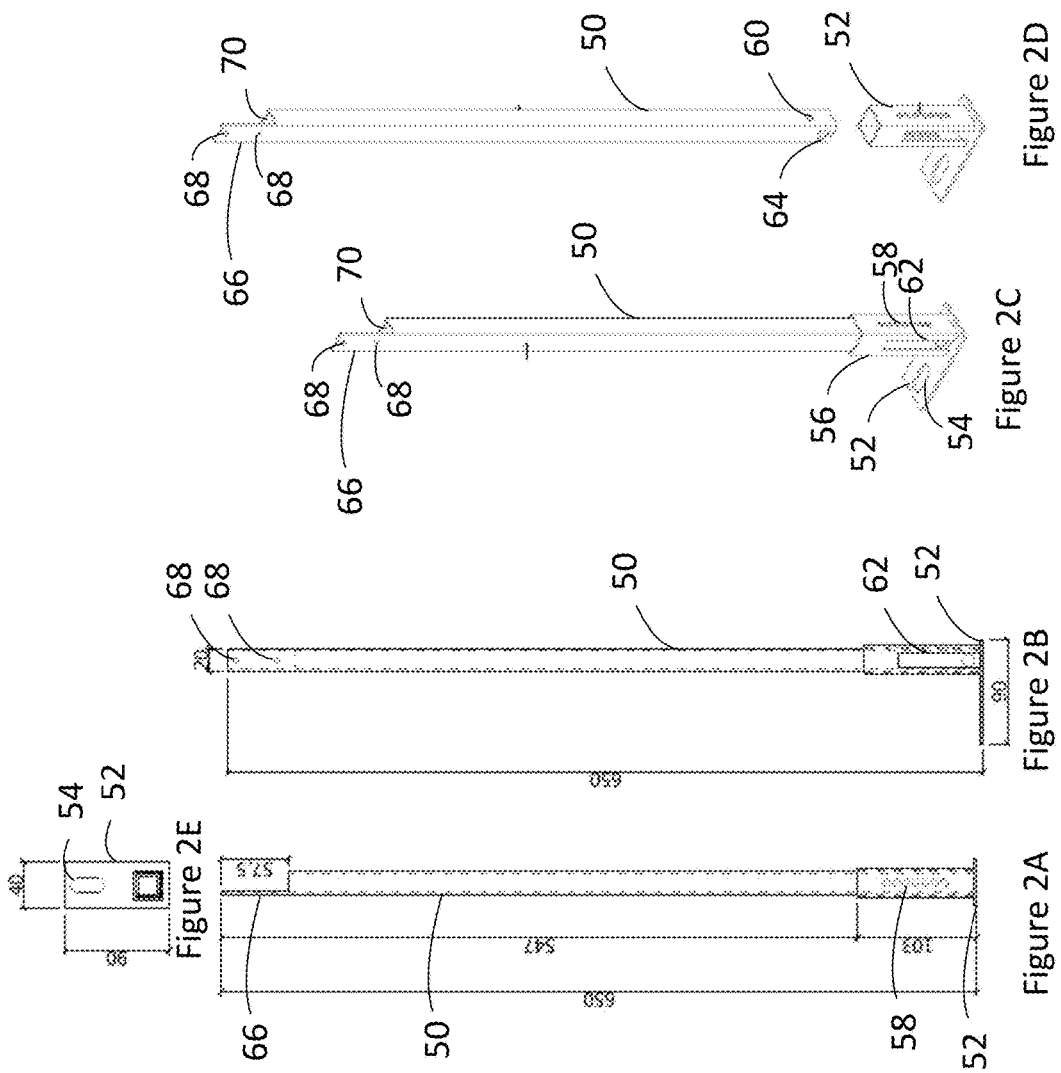

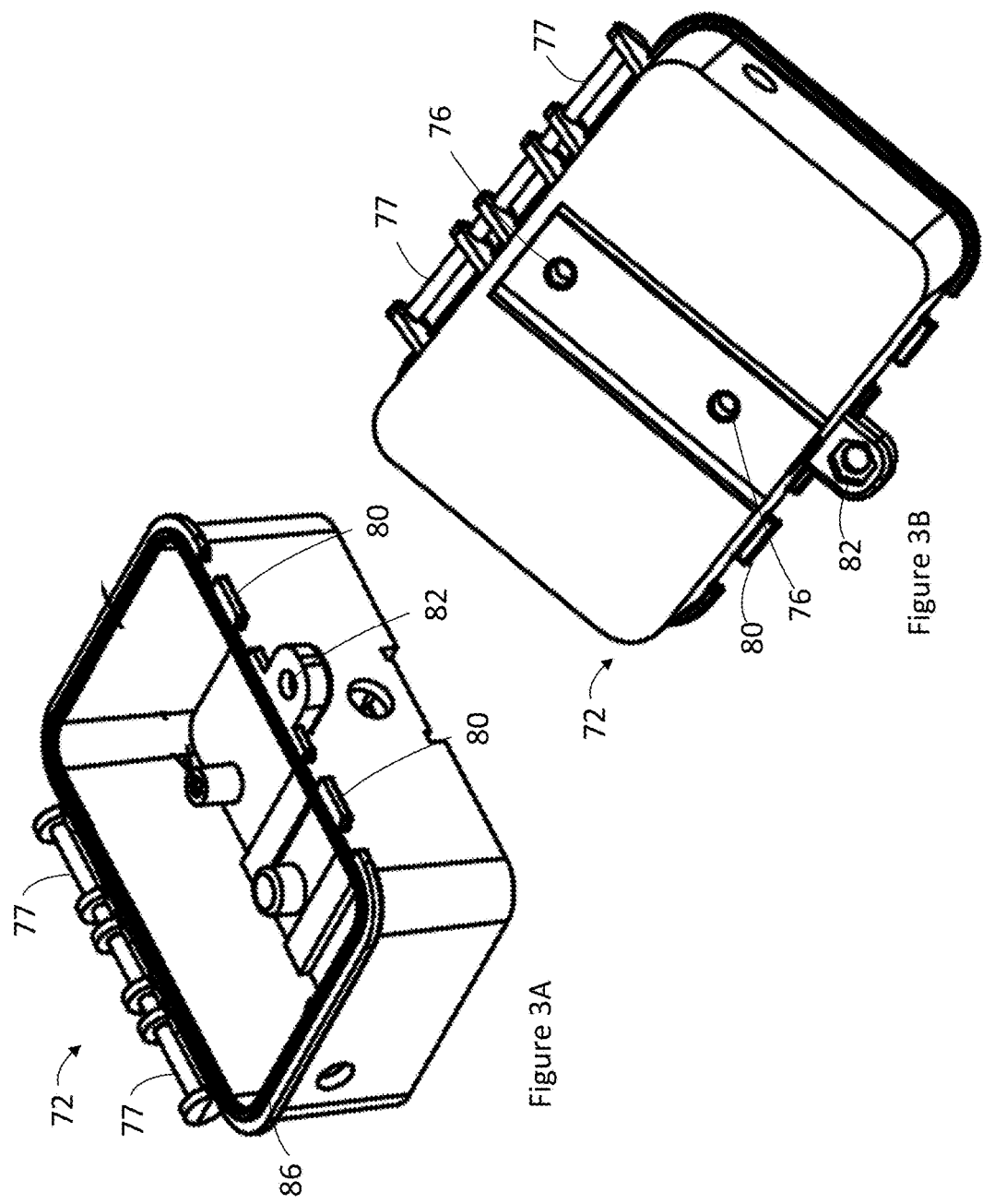

SYSTEM AND METHOD FOR MONITORING WATER LEVEL ON A ROOF

TECHNICAL FIELD

The embodiments disclosed herein relate to roofing, and, in particular to systems and methods for monitoring a roof.

INTRODUCTION

A flat roof is a roof which is almost level in contrast to the many types of sloped roofs. The slope of a roof is known as its pitch and flat roofs have up to an approximately 10 degree pitch. Flat roofs may be used for commercial or institutional buildings may allow the increased commercial space below.

Flat roofs do not enjoy the intrinsic drainage of precipitation of sloped roofs. Flat roofs accumulate precipitation which is expelled through one or more drains. The drains are equipped with strainers to exclude debris such as leaves and branches and ice, thereby preventing clogging of the drain. Drains do become blocked by debris and ice, or may simply be overcome by excessive precipitation which may compromise the structural integrity of the roof. It is important to become aware if the drains are not functioning properly to remove water from the roof, so that the drains can be unblocked or repaired.

The need to know when the drain is functioning properly is important as it alerts the building owner of a potential problem with the drainage system, whether it be a problem with debris at the roof drain dome or an actual stoppage in the piping system. Conventional systems rely a building manager observing the perimeter of the building or performing a visual inspection of on the roof. Accordingly, there is a need for an improved method and system for monitoring a roof drain.

SUMMARY

According to some embodiments, there is a drain monitor, a system, and a method for monitoring water level on a roof. The drain monitor includes a base for attaching to the roof, a riser attached to the base and projecting from the roof, a water level sensor attached to the riser for measuring water level on the roof, and a communication system positioned on the riser for transmitting measurement data received from the water level sensor.

According to an embodiment, there is a drain monitor for monitoring water level on a roof. The drain monitor includes a base for attaching to the roof, a riser attached to the base and projecting from the roof, a water level sensor attached to the riser for measuring water level on the roof, and a communication system positioned on the riser for transmitting measurement data received from the water level sensor.

In an aspect, the water level sensor detects whether there is a flood on the roof. In an aspect, the water level sensor includes a float and wherein the float floats up and down based on the water level on the roof. In an aspect, water level sensor includes a stop, wherein the stop is positioned at the lower range of the float to provides a resting position for the float, and wherein the water level sensor senses the movement of the float off of the stop. In an aspect, the water level sensor is adjustably attached to the riser. In an aspect, the water level sensor includes an attachment member inserted into an attachment slot on the riser. In an aspect, the water level sensor is positioned proximal to a roof drain.

In an aspect, the communication system transmits the measurement data to a system gateway. In an aspect, the communication system includes a communication box, a communication box cover, and a gasket for providing a weather tight compartment for housing electronics of the communication system.

According to an embodiment, there is provided a drain monitoring system. The drain monitoring system includes a roof sensor device configured to measure water level on a roof and transmit a water level signal, and a system gateway configured to receive the water level signal and transmit the water level signal to a system server.

In an aspect, the drain monitoring system further includes a system server configured to receive the water level signal and send roof data, alerts, and warnings to at least one user communication device. In an aspect, the user communication device is configured for any one or more of a property manager user, a roofer user, a consultant user, or an insurance company user.

In an aspect, the roof sensor device includes at least one water level sensor for measuring water level on the roof, a database for storing the measurement data received from the at least one water level sensor, a processor for processing the measurement data, and a transceiver for sending and receiving data messages from the system gateway. In an aspect, the roof sensor device includes a power supply for providing power to the transceiver, the database, and the processor.

In an aspect, the system gateway is configured to receive third party weather data and wherein the roof sensor device modifies the frequency of water level measurement based on the third party weather data.

In an aspect, the drain monitoring system includes a plurality of roof sensor devices, and wherein the user communication device displays a location of the roof sensor devices on a satellite image of a buildings that the roof sensor devices are installed.

According to an embodiment, there is provided a method for roof monitoring. The method includes sensing a water level, transmitting a water level reading to a system gateway, collecting the water level reading, creating a visualization of the water level readings, and sending the visualization to a user.

In an aspect, the visualization includes an alarm indicating a high water level.

In an aspect, the method further includes collecting the water level readings at a predetermined polling period based on environmental data.

In an aspect, the method further includes determining if the environmental data has reached a threshold and where the environment data has reached the threshold, sending an alarm to a user.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIGS. 2A-2E are front, rear, perspective, and exploded views, respectively, of a riser for a drain monitor, in accordance with an embodiment;

FIGS. 3A and 3B are top perspective and bottom perspective views, respectively, of a communication box of a drain monitor, in accordance with an embodiment;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
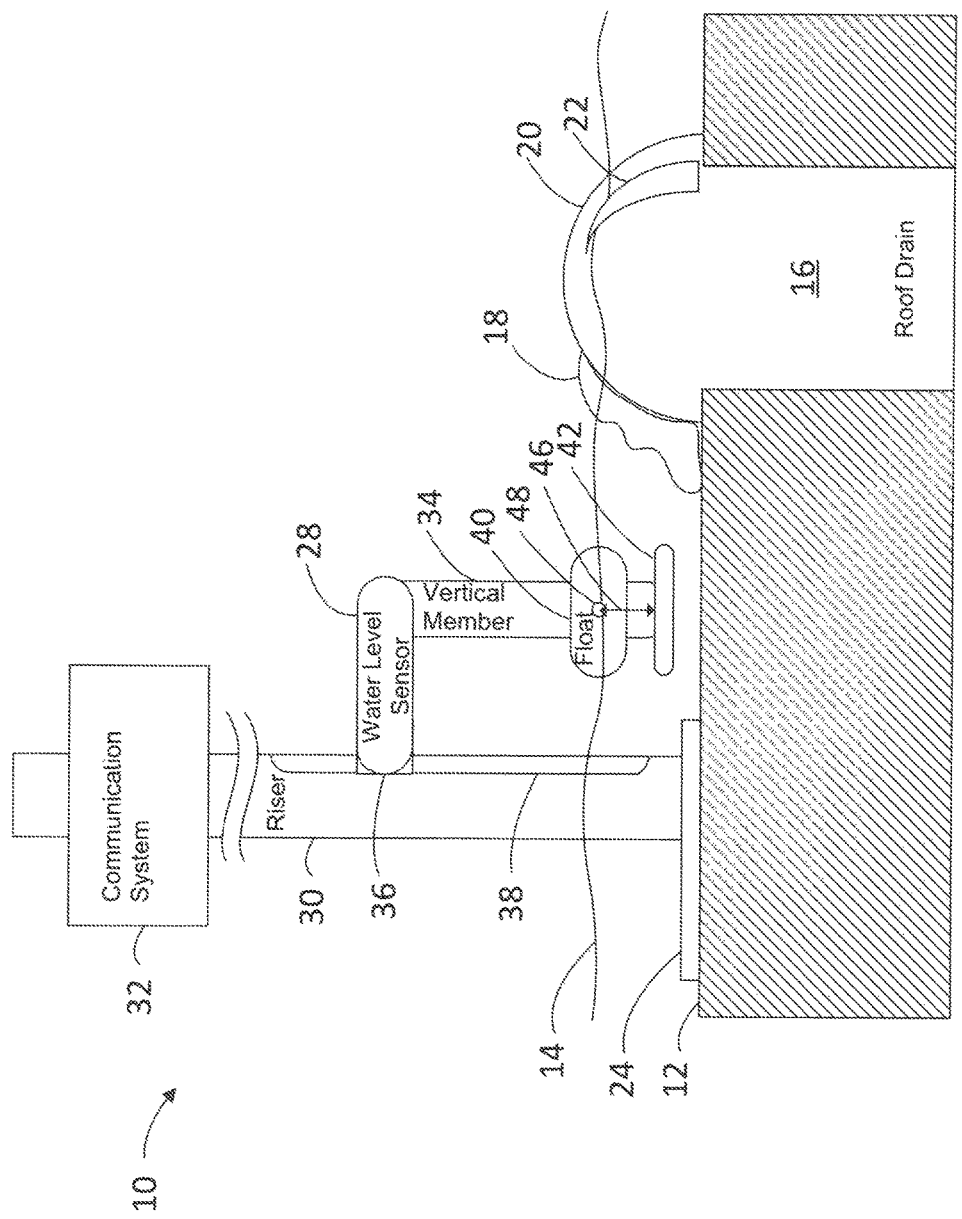
FIG. 1 is a schematic drawing of a drain monitor, in accordance with an embodiment.

Referring to FIG. 1, illustrated therein is a drain monitor 10, in accordance with an embodiment. The drain monitor 10 is positioned on a roof 12 for measuring the amount of fluid such as precipitation or water 14 on the roof 12. The roof 12 may be, for example, a flat roof of a commercial or industrial building. The drain monitor 10 may be positioned proximate to a roof drain 16.

The roof drain 16 has a drain guard 20 for blocking large, potentially clogging debris 18 from passing into the roof drain 16. The roof drain 16 also has apertures 22 for allowing fluid, such as rainwater, to pass into the roof drain 16. The roof drain 16 may be a conventional drain, as is known in the art. The drain monitor 10 may be installed directly adjacent to the roof drain 16 such that any flooding of the roof drain would occur first at the location of the drain monitor 10.

The drain monitor 10 includes a base 24 that attaches to the roof 12. The base 24 may be attached (e.g., using fasteners, bolts, adhesive, or the like) to the roof 12. The drain monitor 10 is fixed to the roof 12 and may be positioned above or below a drainage medium such as gravel and/or insulation. In certain embodiments, one or more of the drain monitors 10 may be part of a system for roof monitoring. For example a plurality (e.g., four) drain monitors 10 may be positioned on the same roof 12 at various locations, including locations proximate to roof drains 16.

The base 24 connects with a riser 30 that projects away from the surface of the roof 12. The riser 30 includes a communication system 32 positioned at a distal end of the riser 30 away from the roof 12. The communication system 32 is positioned away from the roof 12 so that if the roof 12 floods, the communication system 32 is the furthest component of the drain monitor 10 from the flooding water. The communication system 32 is also positioned away from the roof 12 to improve transmission and reception of signals.

Also attached to the base 24 is a water level sensor 28 for detecting water level, such as a change in the water level. In particular, the water level sensor 28 detects whether there is a potential flood or a likely flood on the roof 12. The water level sensor 28 is adjustably attached to the riser 30 and is directed away from the riser 30 and towards the roof drain 16.

The water level sensor 28 is adjustably attached to the riser 30 with an attachment member 36. The attachment member 36 of the water level sensor 28 is inserted into an attachment slot 38 on the riser 30. The attachment member 36 may allow the water level sensor 28 to be adjusted a desired monitoring level. For example, the water level sensor 28 is adjustable so that the water level sensor 28 can be positioned close to (e.g., 0.5 inches to 3.5 inches) the surface of the roof 12 such that a predetermined water level limit can be detected (e.g., 2 to 2.5 inches). In some cases, the water level sensor 28 may be installed directly over the roof drain 16.

The water level sensor 28 includes a vertical member 34 that includes a float sensor 48 which closes a circuit to signal that a water level limit has been reached. In a particular embodiment, the float sensor 48 includes a float 40 and a stop 42. The float 40 floats up and down on the vertical member 34 and raises and lowers based on the water level on the roof 12. The stop 42 is positioned at the lower range of the float 40 and provides a resting position for the float 40, where the is no flooding or a low level of water. The stop 42 may be adjustably positioned to the surface of the roof 12 by sliding the attachment member 36 into position in the slot 38 so that the float 40 will move with a minimal amount of flooding on the roof 12.

In certain cases, the float sensor 48 includes a mechanical switch having an electrode that, when water is present, is triggered when positive and negative electrodes are connected. In variant embodiments, the water level sensor 28 includes other types of water level sensors such as float levers and mechanical switches, as is known in the art.

In certain cases, debris 18 such as leaves, ice, or snow will block the roof drain 16 causing the roof drain 16 to be clogged. The roof drain 16 may also be clogged internally. When the roof drain 16 is clogged, precipitation is prevented from passing into the roof drain 16 and the precipitation begins to accumulate on the roof 12. In certain cases, the roof drain 16 will allow some precipitation to pass through but not at the same rate as the influx of precipitation causing accumulation of precipitation on the roof 12.

When the water 14 rises to a level above the float 40, the float 40 is raised off of the stop 42 and floats a distance 46. The float sensor 48 is triggered with the movement of the float 40. The float sensor 48 may also sense the movement of the float 40 off of the stop 42. When the float sensor 48 is triggered, the float sensor 48 sends an electronic signal to the communication system 32. The communication system 32 transmits a signal of measurement data to a system gateway that the roof drain 16 may not be functioning to drain water. The roof monitor 10 may include at least two work states for providing alarms, described with reference to FIGS. 6 and 7.

FIGS. 2A-2E illustrate a riser 50 and a base 52, in accordance with an embodiment. The riser 50 and the base 52 may operate as described with reference to FIG. 1. The base 52 includes a roof attachment aperture 54 for receiving at least one fastener for affixing the base 52 proximal to a roof drain. The base 52 also includes a riser section 56 for receiving the riser 50 therein. The riser 50 may be about 10 to 12 inches to provide a distance from any roof flooding or snow accumulation as well as improved communication ability. The riser 50 may be removable attached the to the riser section 56 of the base via fasteners (not shown) that pass through riser apertures 58 and a corresponding aperture 60 on the riser 50. The riser section 56 may include a plurality of riser apertures 58 so that the riser 50 may be positioned at a variety of different heights.

The riser section 56 includes a slot 62 for receiving the drain sensor (not shown), such as water level sensor 28 described with reference to FIG. 1. The riser 50 includes a sensor aperture 64 for receiving the drain sensor and wire (not shown). The wire passes through a hollow center 70 of the riser 50 towards an upward end 66 where a communication box 72 (FIG. 3A) is received. The upward end 66 includes communication box 72 and apertures for receiving fasteners 68 that attach the communication box 72 to the riser 50. The communication box 72 has corresponding apertures 76 for attaching to the riser 50.

Figure 3D:
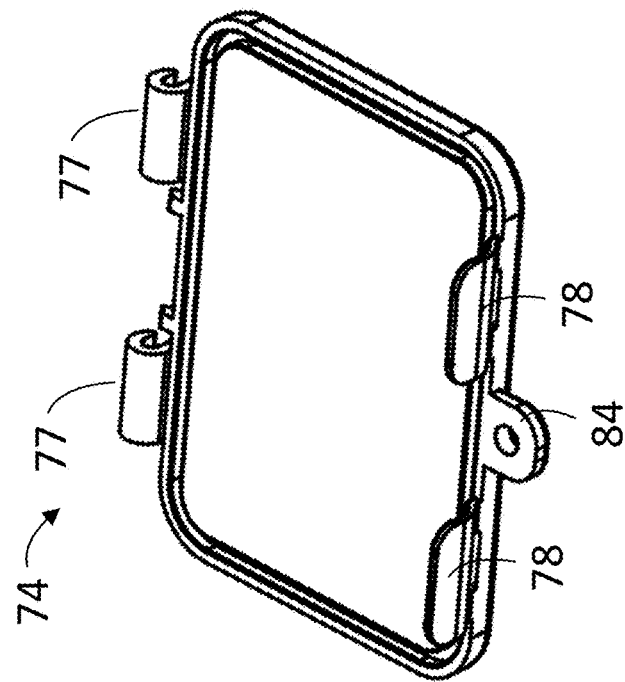
FIGS. 3C and 3D are inner perspective and outer perspective views, respectively, of a communication box cover of a drain monitor, in accordance with an embodiment.
Figure 3C:
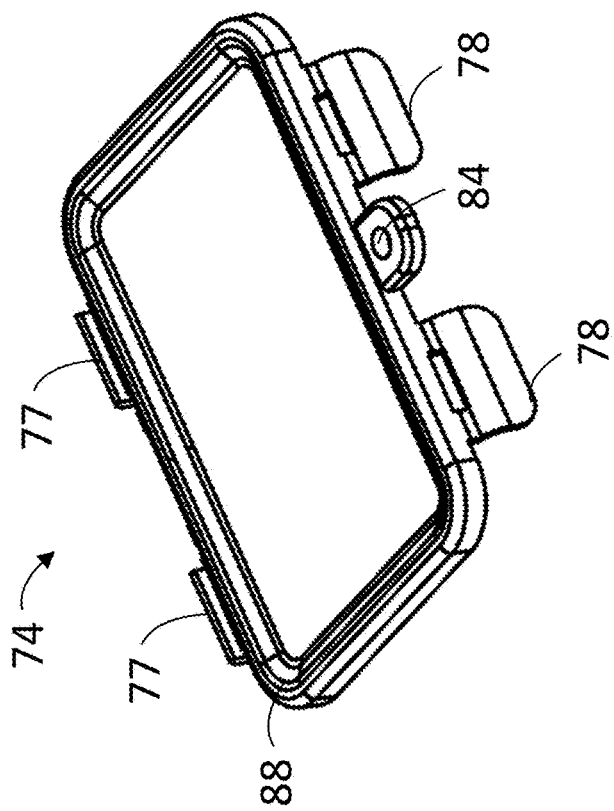

FIGS. 3A and 3B illustrate the communication box 72 and FIGS. 3C and 3D illustrate a communication box cover 74, in accordance with an embodiment. The communication box 72 and the communication box cover 74 together form the communication system 32 for housing the communication electronics for sending and receiving signals to the system gateway.

The communication box 72 and communication box cover 74 include hinge portions 77 and the communication box cover 74 includes tabs 78 that correspond with latches 80 on the communication box 72 to allow for a user to gain access to the contents of the communication system 32. The communication box 72 and communication box cover 74 may also include lock apertures 82, 84, respectively, for locking the communication system 32 closed.

The communication box 72 includes a gasket 86 and the communication box cover 74 includes a corresponding groove 88 that provide a weather tight compartment for housing the electronics of the drain monitor 10. The communication box 72 and communication box cover 74 may include a reflective covering to reflect radiant light to lower the internal temperature of the communication system 32. In a variant embodiment, the communication system 32 may include cooling fins to further reduce the temperature of the internal temperature of the communication system 32.

Figure 4:
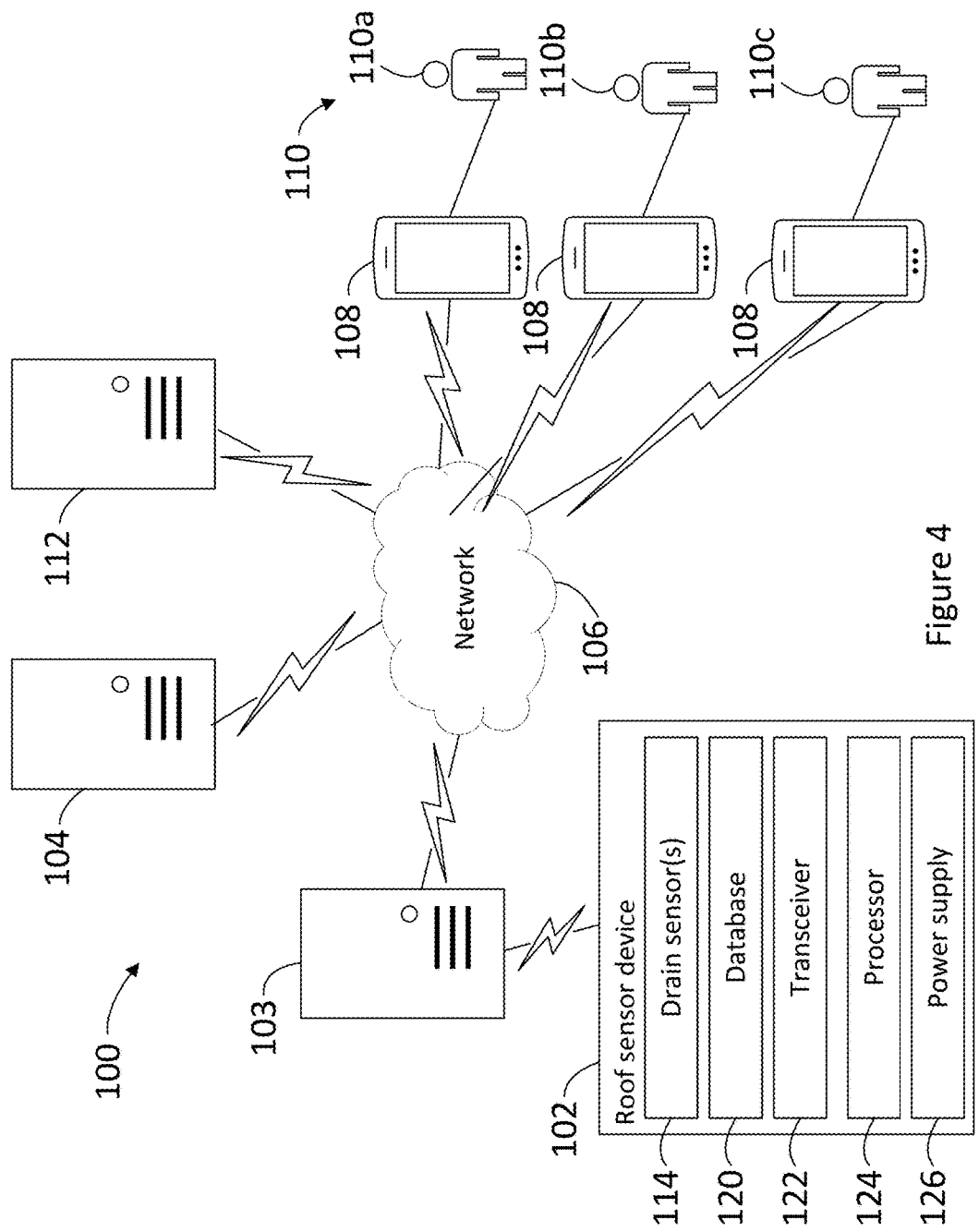
FIG. 4 is a block diagram of a roof monitoring system, in accordance with an embodiment.

Referring to FIG. 4, illustrated therein is a drain monitoring system 100, in accordance with an embodiment. The drain monitoring system 100 includes a roof sensor device 102, such as the drain monitor 10 as described with respect to FIG. 1. The roof sensor device 102 includes at least one water level sensor 114 such as the float sensor 28, as described with reference to FIG. 1.

The roof sensor device 102 measures a water level and transmits a water level signal to a system gateway 103 which transmits a communication to a system server 104. The roof sensor device 102 communicates directly with the system gateway 103 (e.g., Near Field Communication (NFC), Bluetooth™, etc.), and/or the roof sensor device 102 may communicate with the system gateway 103 over a network 106 (e.g., the Internet).

The system gateway 103 may be located in the building where the roof sensor device 102 is installed. The system gateway 103 receives the measurement data from the roof sensor device 102 and transmits the measurement data to a system server 104 via the network 106. The gateway 103 may be installed near a window, for improved communication, in the building holding the roof sensor device 102. The gateway 103 is connected to the network 106 (e.g., via Ethernet and/or GPRS (General Packet Radio Service)) and the power source is connected. The gateway 103 includes an antenna that is directed upward towards the roof sensor device 102.

The system server 104 is a central portal and includes a database for storing roof data. The system server 104 stores statistical data and maintenance records about the roof. The statistical data and maintenance records may be provided from contractors and trades service companies that have performed installation or maintenance services on the roof.

The system server 104 may be maintained by the service provider for roof sensor device 102 customers. The system server 104 may be accessed in locations provided with network 106 connections to check property status and history records.

The system server 104 sends roof data, alerts, and warnings to a user communication device 108. The user communication device 108 is for example, a mobile device, a mobile phone, a tablet, a smart phone, a laptop, a purpose built computer, a general purpose computer, or the like. The user communication device 108 has communication capabilities to receive and send water level data. The user communication device 108 also has data display capabilities to display information to a user 110. In certain embodiments, there may be a plurality of user communication devices 108 for a plurality of users 110.

The users 110 may be, for example, a property manager user 110a, a roofer user 110b, a consultant, or an insurance company user 110c. The users 110 are grouped with categories and are provided with different services.

The property manager user 110a is able to add, remove, view, and update property information. The property manager user 110a can login and logout of the system to check the sensor status online. The property manager user 110a can register contacts for property for notifications. The property manager user 110a can authorize roofer users 110b for access and register roofer users 110b for service. The property manager user 110a can inform trades and maintenance providers with information and timelines. The property manager user 110a can verify warranty alarms. The warranty alarm may automatically provide a notice to the property manager user 110a that the warranty period for the roof is about to expire so that the property manager user 110a can initiate an inspection of the roof prior to expiry of the warranty period.

The roofer user 110b can monitor a customer's roofs, receive notifications if service is needed and find potential business.

The insurance company user 110c can track the historic data of a client's roof such as statistical data for geographic area roofing information. The insurance company user 110c may be able to reduce the risk for damages to the building from roofing flood, collapse, and fire.

The system server 104 also receives information from third party databases 112. The third party databases 112 provide information related to weather and satellite data. The third party data may include history maintenance records, weather alarms, and property construction details, for example.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The drain monitoring system 100 includes the roof sensor device 102, which communicates with the system gateway 103, the system gateway 103 which communicates with the system server 104, the system server 104 which communicates with the plurality of user communication devices 108, via the network 106. The roof sensor device 102, the system gateway 103, and the server 104 may be purpose built machines designed specifically for roof monitoring. The roof monitoring device 102, the system gateway 103, and system server 104 may receive, process, and deliver roof monitoring data.

The roof monitoring device 102, the system gateway 103, the system server 104, and user communication devices 108 may be a server computer, desktop computer, notebook computer, tablet, PDA, smartphone, or another computing device. The devices 102, 103, 104, 108 may include a connection with the network 106 such as a wired or wireless connection to the Internet. In some cases, the network 106 may include other types of computer or telecommunication networks. The devices 102, 103, 104, 108 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 106. Input device may include any device for entering information into devices 102, 103, 104, 108. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, devices 102, 103, 104, 108 may include multiple of any one or more of processors, applications, software modules, secondary storage devices, network connections, input devices, output devices, and display devices.

Although devices 102, 103, 104, 108 are described with various components, one skilled in the art will appreciate that the devices 102, 103, 104, 108 may in some cases contain fewer, additional or different components. In addition, although aspects of an implementation of the devices 102, 103, 104, 108 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 102, 103, 104, 108 and/or processor to perform a particular method.

The devices such as the roof sensor device 102, the system gateway 103, the system server 104, and the user communication devices 108 are described performing certain acts. It will be appreciated that any one or more of these devices 102, 103, 104, 108 may perform an act automatically or in response to an interaction by a user of that device. That is, the user of the device may manipulate one or more input devices (e.g. a touchscreen, a mouse, or a button) causing the device to perform the described act. In many cases, this aspect may not be described, but it will be understood.

The roof sensor device 102 includes a database 120 for storing measurement data received from the water level sensor 114 (such as the water level sensor 28 of FIG. 1). The roof sensor device 102 includes a processor 124 for processing the measurement data. The roof sensor device 102 includes a transceiver 122 for sending and receiving data messages from any one or more of the user communication devices 108, the system server 104, and the third party databases 112 via the system gateway 103.

The roof sensor device 102 includes a power supply 126 for providing power to the transceiver 122, database 120, and processor 124. The power supply 126 may be a hard wired connection, and/or a battery power supply. The power supply 126 may be designed to provide power to the roof sensor device 102 for a long period of time (e.g., years) as it may be undesirable or inconvenient of a user to replace battery power sources often.

The power supply 126 may have a standby mode, where, in winter months, when snow is present the roof sensor device 102 will sense the roof drain less regularly as there is less water present.

The roof sensor device 102 may also receive third party weather data from the third party databases 112, to confirm rain events, and the roof sensor device 102 will more frequently measure the water level. Where there are not rain events, the roof sensor device 102 may enter a standby mode, measuring the water level less often and conserving energy from the power supply.

The power supply 126 and other roof sensor device 102 components may be resistant to extreme heat (e.g., 60 degrees Celsius) generated on the roof as well as extreme cold (e.g., −40 degrees Celsius) through winter months. The communication system (e.g. communication system 32 of FIG. 1), may also include reflective surface to reflect light and radiant heat energy to reduce the heat of the roof sensor device 102, including the power source.

In certain embodiments, the power supply 126 includes a solar panel and a rechargeable battery. When solar energy is received, the solar panel provides recharging energy to the rechargeable battery. As the roof sensor device 126 is located on the roof of a building, the solar panel may be provided with a direct line of solar energy.

In certain embodiments, the database 120, the transceiver 122, the processor 124, the power supply 126, and other circuitry of the roof sensor device 102 may be in a communication box, such as the communication box and cover 72, 74 described with reference to FIGS. 3A-3D.

Figure 5:
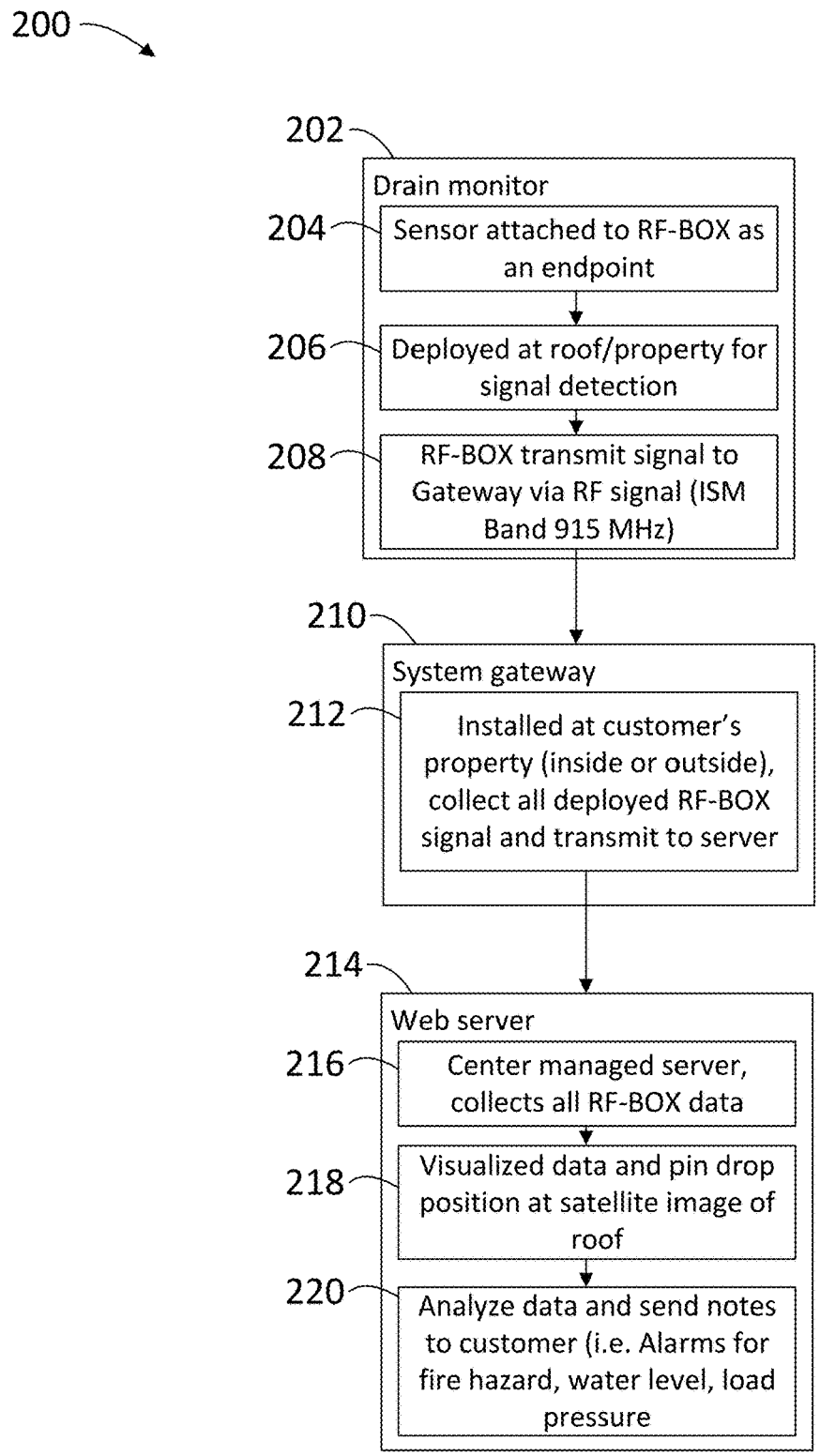
FIG. 5 is a flow chart of a method for roof monitoring, in accordance with an embodiment.

Referring now to FIG. 5, illustrated therein is a method for roof monitoring 200, in accordance with an embodiment. At 202, the drain monitor (e.g., 10, 102) is positioned at a roof drain. The base is affixed to the roof proximal to a roof drain. The riser is positioned in the base. The sensor box cover is opened and the drain monitor is turned on.

Optionally, the user may perform a battery check. The user may also verify that LED indicators are functioning properly. For example, a red and a blue LEDs blink for 1 second, then go off and a moment later, the red LED flashes 5 times. If the red LED does not flash 5 times or keep flashing, the drain monitor is out of signal range or in a blind spot.

Optionally, the user may perform a sensor test by triggering the water level switch for 5 seconds. The red LED should then flash.

Once the roof sensor device 102 is installed on the roof, the installer marks a sensor device identifier on a roof map to register the location of the roof sensor device.

At 204, the sensor takes a reading. At 206, the RF-BOX (e.g., communication system 32) detects the sensor reading. At 208, the RF-BOX transmits a signal to a system gateway 210. At 212, the system gateway 210 collects the RF-BOX signals and transmit the RF-BOX signals to a web server 214 (e.g., system server 104).

At 216, the web server 214 collects the RF-BOX data. At 218, the web server 214 creates visualization of the RF-BOX data as pin drop position on a satellite image of the roof (see FIGS. 8A-8C, for example). At 220, the web server 214 analyzes the RF-BOX data and sends the visualization to the customer. The data may include a high water level alarm.

Figure 6:
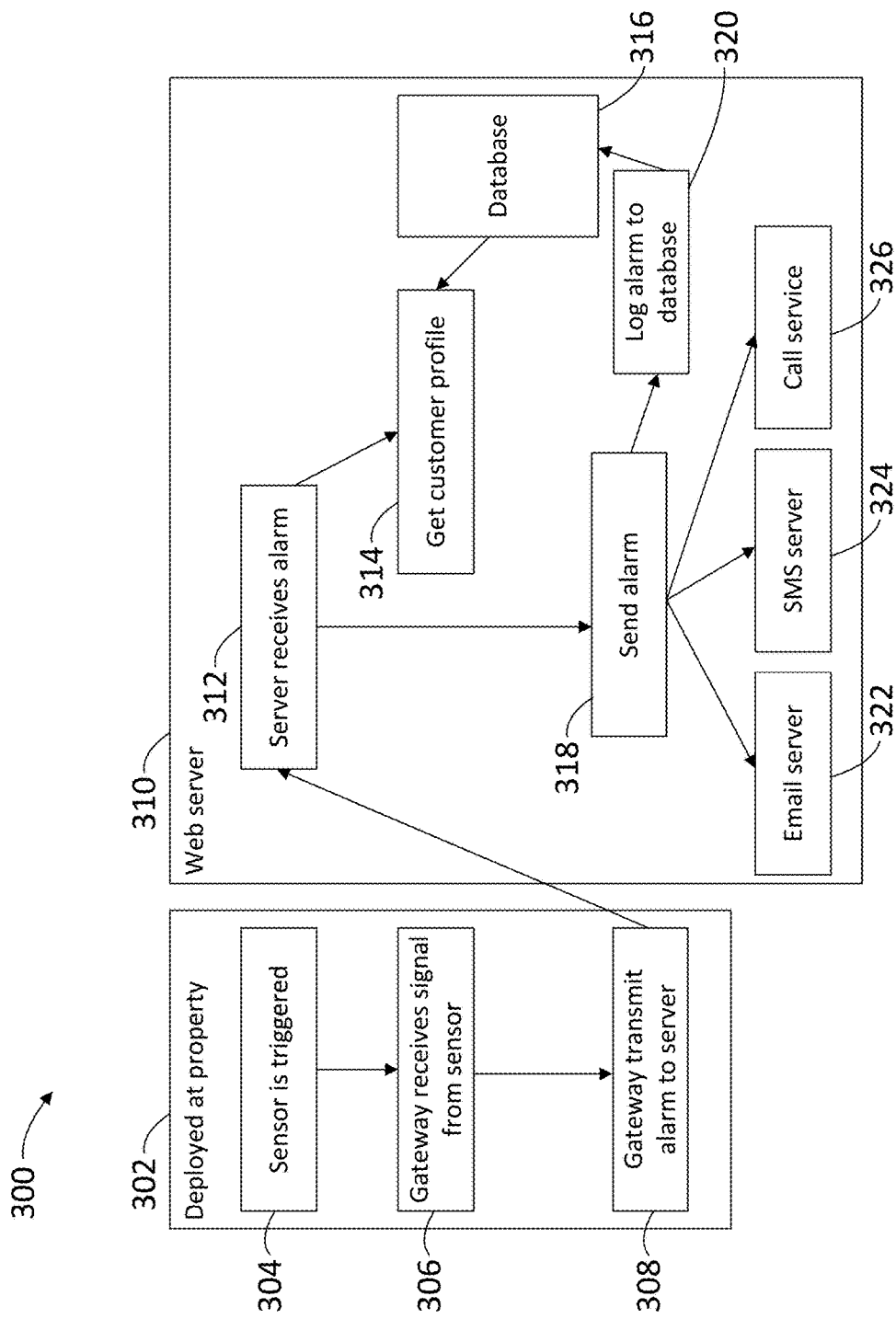
FIGS. 6 and 7 are methods for sending drain monitor alarms, in accordance with an embodiment.

FIG. 6 illustrates a collecting data state method 300 for sending a drain flood alarm, in accordance with an embodiment. The sensor collects the measurement data and posts the measurement data to the server at a predetermined polling period (e.g., twice a day). The polling period may depend on any one or more of the time of year, user preferences, third party weather data, historic data, and roof design. The server stores the data in the database for analysis and history tracking. If the measurement data reaches the preset threshold, the server will then compose an email and/or SMS to contact the client automatically.

At 302, the drain monitor (e.g. drain monitor 10 of FIG. 1) is installed at the roof location. When the sensor is triggered, at 304, the drain monitor sends a flood signal to the gateway. At 306, the gateway receives the flood signal from the drain monitor and, at 308, the gateway transmits an alarm to the web server.

At 310 the web server processes the alarm. The alarm is received by the web server, at 312. The web server retrieves the customer profile, at 314, from a database 316. The customer profile includes alarm details on who should be notified, and how the user should be notified.

At 318, the web server sends the alarm to the user. The web server logs the alarm in the database at 320. Depending on the type of alarm, the web server emails the alarm at 322, SMS the alarm at 324, or calls in the alarm at 326.

Figure 7:
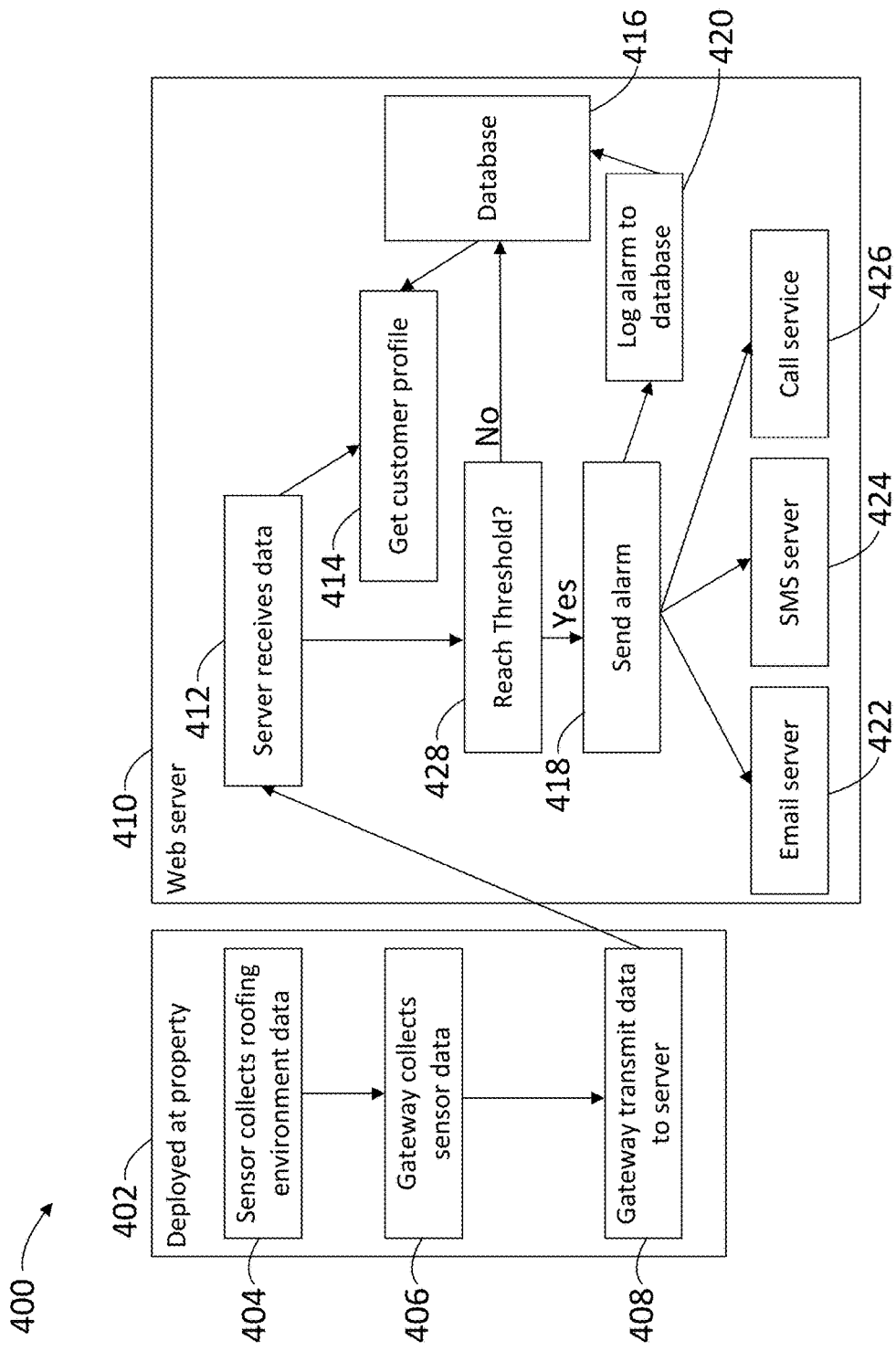

FIG. 7 illustrates a sensor alarm triggered method 400 for sending a drain flood alarm, in accordance with an embodiment. When the sensor alarm is triggered, the sensor immediately sends out an alarm. The server then transmits the alarms to the users. The server logs the data for data analysis and check.

At 402, the drain monitor (e.g. drain monitor 10 of FIG. 1) is installed at the roof location. The sensor collects roofing environment data (such as temperature or humidity), at 404, and the drain monitor sends the environment data to the gateway. At 406, the gateway receives the environment data from the drain monitor and, at 408, the gateway transmits the environment data to the web server.

At 410 the web server processes the environment data. The environment data is received by the web server, at 412. The web server retrieves the customer profile, at 414, from a database 416. The customer profile includes details on what type of environmental conditions will trigger an alarm. The customer profile includes threshold data, such as how much temperature and humidity is required for an alarm to be sent.

At 428, the web server determines if the environment data has reached the threshold. If not, the environment data is saved in the database and no alarm is sent. If the threshold has been met, the web server sends the alarm to the user, at 418. The web server logs the alarm in the database at 420. Depending on the type of alarm, the web server emails the alarm at 422, SMS the alarm at 424, or calls in the alarm at 426.

Figures 8A, 8B:
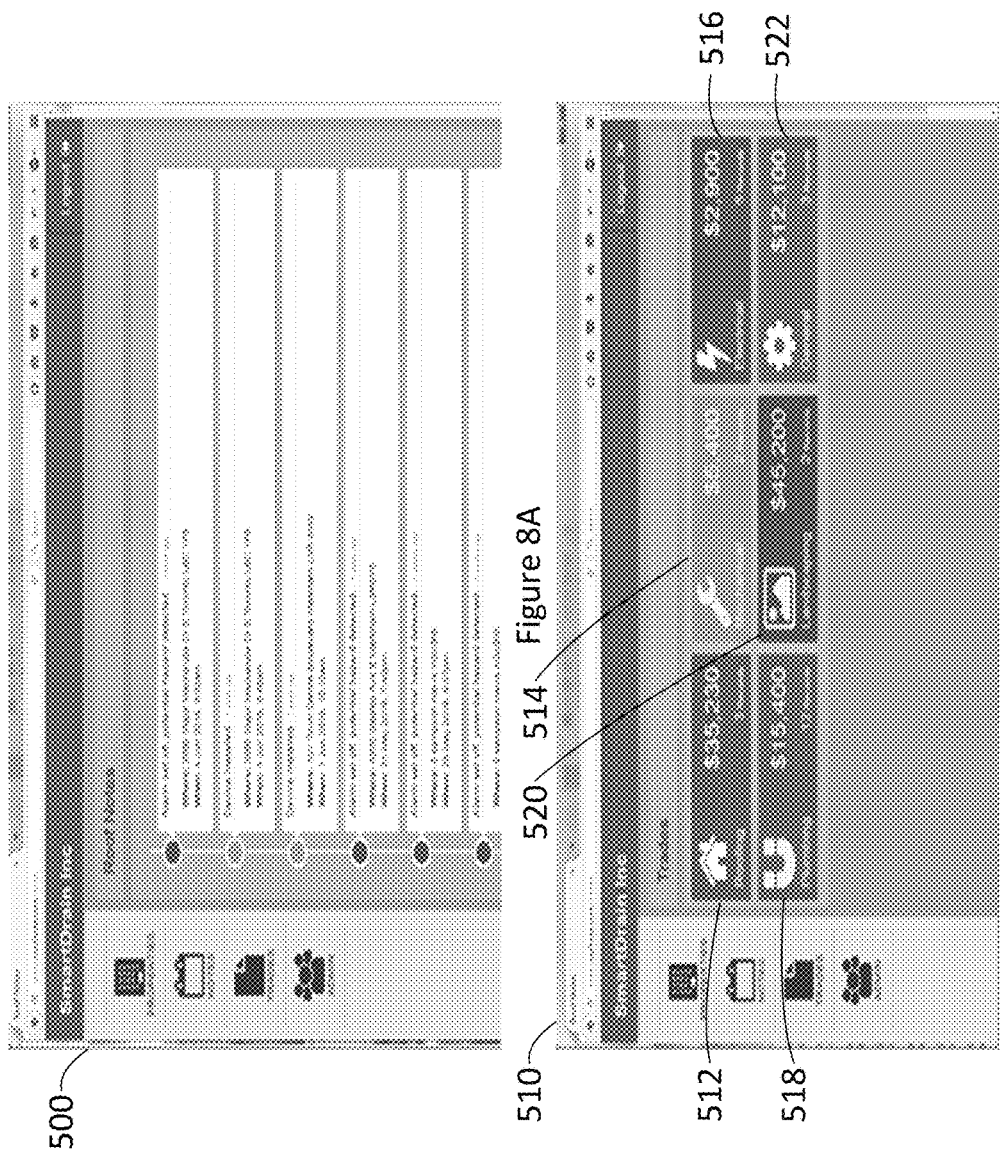
FIGS. 8A-8C are screenshots of visualization of roof data, in accordance with an embodiment.
Figure 8C:
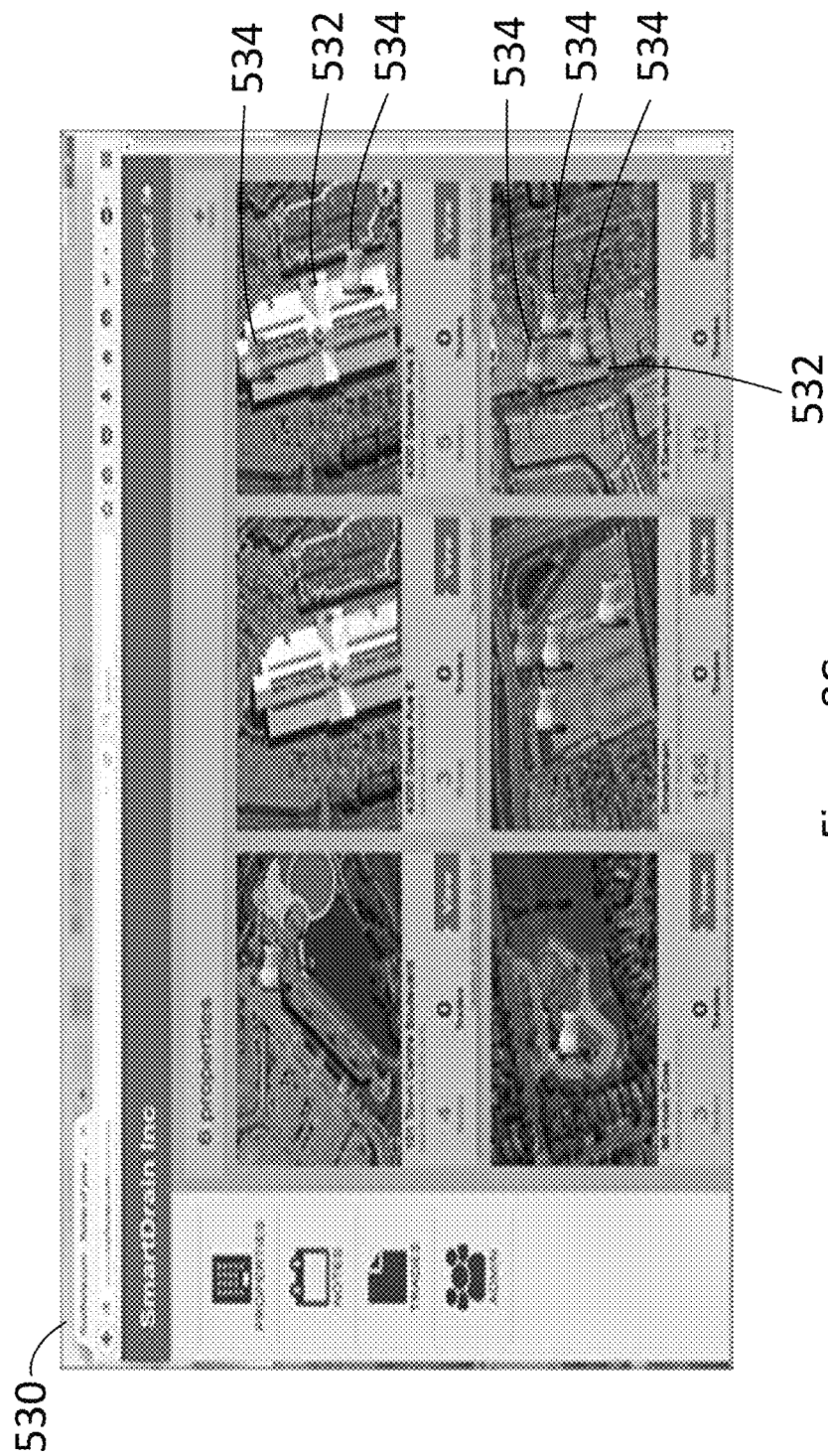

Referring now to FIGS. 8A-8C, illustrated therein are screenshots of a drain monitoring application, in accordance with an embodiment. In particular, FIG. 8A illustrates roof notes 500. The roof notes 500 describes roof information such as alarms that have been triggered, the installation of the drain monitor, and the historic maintenance of the roof and drain monitor.

FIG. 8B illustrates a trades page 510 for the drain monitor. The trades page 510 includes information about what installation and maintenance has been performed on the roof, including roof costs 512, mechanical repairs 514, electrical investment 516, plumbing work 518, landscaping performed 520, and general work 522 on the building. The trades page 510 may help with the overall management of the property and provide an comprehensive dashboard to complement the drain monitor.

FIG. 8C illustrates a drain location page 530 showing the location of the drain monitors. The drain location page illustrates the properties 532 that are under control of the user. The drain location page illustrates satellite images of the building with the drain monitor. The drain monitors are marked in the specific location on the satellite images of the buildings that they are installed, for example, using flags 534. The flags 534 (e.g. a red flag) may alert the property manager to the particular drain monitor that is experiencing an alarm. The property manager can then dispatch a team to deal with the alarm condition. Each building or property 532 may have multiple flags 534. The flags 524 may change in appearance (color) depending on any alarm condition, (e.g., flooding, battery dead, signal loss, normal). The flags 524 may appear in a certain color (e.g., green) where there are no alarms on the drain and the drain is operating normally.

While the above description provides examples of one or more apparatus, methods, or systems, it will be appreciated that other apparatus, methods, or systems may be within the scope of the claims as interpreted by one of skill in the art.

The invention claimed is:

1. A drain monitor for monitoring water level on a roof, the drain monitor comprising:
   a base for attaching to the roof;
   a riser attached to the base and projecting from the roof;
   a water level sensor for measuring water level on the roof, the water level sensor comprising an attachment member and a vertical member, wherein
      the attachment member comprises a first attachment end and a second attachment end,
      the first attachment end is adjustably attached to the riser such that the first attachment end is inserted into an attachment slot on the riser,
      the attachment member is directed away from the riser,
      the vertical member is attached to the second attachment end and extends downward towards the roof, and
      the vertical member comprises a float sensor that floats up and down on the vertical member to measure water level; and
   a communication system positioned on the riser for transmitting measurement data received from the water level sensor.

2. The drain monitor of claim 1, wherein the sensor detects whether there is a flood on the roof.

3. The drain monitor of claim 1, wherein the float sensor includes a float and wherein the float floats up and down based on the water level on the roof.

4. The drain monitor of claim 3, wherein the float sensor includes a stop, wherein the stop is positioned at the lower range of the float to provides a resting position for the float, and wherein the water level sensor senses the movement of the float off of the stop.

5. The drain monitor of claim 1, wherein the water level sensor is positioned proximal to a roof drain.

6. The drain monitor of claim 1, wherein the communication system transmits the measurement data to a system gateway.

7. The drain monitor of claim 1, wherein the communication system includes a communication box, a communication box cover, and a gasket for providing a weather tight compartment for housing electronics of the communication system.

8. A drain monitoring system comprising:
   a roof sensor device configured to measure water level on a roof and transmit a water level signal, the roof sensor device comprising:
      a base for attaching to the roof,
      a riser attached to the base and projecting from the roof,
      a water level sensor comprising an attachment member and a vertical member, wherein
         the attachment member comprises a first attachment end and a second attachment end,
         the first attachment end is adjustably attached to the riser such that the first attachment end is inserted into an attachment slot on the riser,
         the attachment member is directed away from the riser,
         the vertical member is attached to the second attachment end and extends downward towards the roof, and
         the vertical member comprises a float sensor that floats up and down on the vertical member for measuring water level on the roof; and
   a system gateway configured to receive the water level signal and transmit the water level signal to a system server.

9. The drain monitoring system of claim 8, further comprising:
   a system server configured to receive the water level signal and send roof data, alerts, and warnings to at least one user communication device.

10. The drain monitoring system of claim 9, wherein the user communication device is configured for any one or more of a property manager user, a roofer user, a consultant user, or an insurance company user.

11. The drain monitoring system of claim 9, wherein the roof sensor device includes:
    at least one water level sensor for measuring water level on the roof;
    a database for storing the measurement data received from the at least one water level sensor;
    a processor for processing the measurement data; and
    a transceiver for sending and receiving data messages from the system gateway.

12. The drain monitoring system of claim 11, wherein the roof sensor device includes a power supply for providing power to the transceiver, the database, and the processor.

13. The drain monitoring system of claim 11, wherein the system gateway is configured to receive third party weather data and wherein the roof sensor device modifies the frequency of water level measurement based on the third party weather data.

14. The drain monitoring system of claim 11 comprising a plurality of roof sensor devices, and wherein the user communication device displays a location of the roof sensor devices on a satellite image of a building that the roof sensor devices are installed.

* * * * *